(12) United States Patent
Chen

(10) Patent No.: US 11,134,384 B2
(45) Date of Patent: Sep. 28, 2021

(54) ACCESS POINT AP AUTHENTICATION METHOD, SYSTEM, AND RELATED DEVICE

(71) Applicant: Honor Device Co., Ltd., Shenzhen (CN)

(72) Inventor: Xi Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 323 days.

(21) Appl. No.: 16/080,663

(22) PCT Filed: Feb. 29, 2016

(86) PCT No.: PCT/CN2016/074818
§ 371 (c)(1),
(2) Date: Aug. 28, 2018

(87) PCT Pub. No.: WO2017/147745
PCT Pub. Date: Sep. 8, 2017

(65) Prior Publication Data
US 2020/0252796 A1 Aug. 6, 2020

(51) Int. Cl.
*H04W 12/08* (2021.01)
*H04W 76/11* (2018.01)
(Continued)

(52) U.S. Cl.
CPC ......... *H04W 12/08* (2013.01); *H04L 61/2015* (2013.01); *H04W 12/06* (2013.01); *H04W 76/11* (2018.02); *H04W 84/12* (2013.01)

(58) Field of Classification Search
None
See application file for complete search history.

(56) References Cited

U.S. PATENT DOCUMENTS 7,885,639 B1    2/2011  Satish et al.
2007/0064934 A1*  3/2007  Batcher ............... H04L 9/3242
                                                           380/44
(Continued)

FOREIGN PATENT DOCUMENTS

CN    101263685 A    9/2008
CN    103856957 A    6/2014
(Continued)

OTHER PUBLICATIONS

Bruce Kraemer et. al, Part 11:Wireless LAN Medium Access Control (MAC) and Physical Layer (PHY) Specifications, 2012, IEEE, IEEE Std 802.11 2012, p. 429-431, 982 (Year: 2012).*

*Primary Examiner* — Noel R Beharry
*Assistant Examiner* — Keith Follansbee
(74) *Attorney, Agent, or Firm* — Kilpatrick Townsend & Stockton LLP

(57) ABSTRACT

An access point AP authentication method, a system, and a related device are provided, so as to improve security of accessing an AP of a WLAN by a terminal. The method is as follows: determining, by the terminal, an AP feature according to a feature generation rule corresponding to the access point AP of the wireless local area network WLAN; sending, by the terminal to the AP, a request message for requesting to provide an AP feature, and obtaining a response message that is returned by the AP according to the request message; and determining, by the terminal according to the response message and the determined AP feature, whether the AP can be authenticated.

15 Claims, 9 Drawing Sheets

(51) Int. Cl.
*H04L 29/12* (2006.01)
*H04W 12/06* (2021.01)
*H04W 84/12* (2009.01)

(56) References Cited

U.S. PATENT DOCUMENTS

| | | | | |
|---|---|---|---|---|
| 2010/0031029 A1* | 2/2010 | Ilyadis | ............... | H04L 9/3271 |
| | | | | 713/156 |
| 2013/0019298 A1* | 1/2013 | Jover Segura | ........ | H04L 63/101 |
| | | | | 726/7 |
| 2013/0095789 A1* | 4/2013 | Keevill | ............ | H04W 12/0608 |
| | | | | 455/411 |

FOREIGN PATENT DOCUMENTS

| CN | 104023336 A | 9/2014 |
|---|---|---|
| CN | 104469764 A | 3/2015 |
| CN | 104580152 A | 4/2015 |
| CN | 104767740 A | 7/2015 |
| CN | 105119901 A | 12/2015 |
| CN | 105120462 A | 12/2015 |

\* cited by examiner

ACCESS POINT AP AUTHENTICATION METHOD, SYSTEM, AND RELATED DEVICE

CROSS-REFERENCE TO RELATED APPLICATIONS

This application is a national Stage of International Application No. PCT/CN2016/074818, filed on Feb. 29, 2016, which is hereby incorporated by reference in its entirety.

TECHNICAL FIELD

The present invention relates to the field of communications technologies, and in particular, to an access point (Access Point, AP) authentication method, a system, and a related device.

BACKGROUND

Currently, a wireless local area network (Wireless Local Area Network, WLAN) is widely applied to a home gateway and an enterprise network. A carrier-class WLAN has formed a scale, to provide a WLAN broadband service for a terminal that has a WLAN function in an outdoor environment.

The terminal searches for a service set identifier (Service Set Identifier, SSID) of an available WLAN, and then selects the SSID to access a broadband network.

Currently, some phishing access point (Access Point, AP) hotspots are usually disguised as operator hotspots or configured as open WLAN systems. If a terminal uses a WLAN system provided by a phishing AP hotspot, the phishing AP hotspot intercepts sensitive information sent by the terminal, and therefore causes a loss to a user of the terminal.

For example, a phishing AP hotspot is disguised as a hotspot with a name same as a WLAN hotspot name CMCC-WEB of a mobile network operator, and has relatively high power. A terminal is automatically connected to the phishing AP hotspot, and a user of the terminal uses the phishing AP hotspot without any knowledge.

SUMMARY

Embodiments of the present invention provide an access point AP authentication method, a system, and a related device, to improve security of accessing an AP of a WLAN by a terminal.

Specific technical solutions provided in the embodiments of the present invention are as follows:

According to a first aspect, an embodiment of the present invention provides an access point AP authentication method, where the method includes:

determining, by a terminal, an AP feature according to a feature generation rule corresponding to an access point AP of a wireless local area network WLAN;

sending, by the terminal to the AP, a request message for requesting to provide an AP feature, and obtaining a response message that is returned by the AP according to the request message; and determining, by the terminal according to the response message and the determined AP feature, whether the AP can be authenticated.

In this embodiment, the terminal determines an AP feature according to the feature generation rule corresponding to the AP, obtains, after sending, to the AP, the request message for requesting to provide an AP feature, the response message returned by the AP, and determines, according to the response message returned by the AP and the determined AP feature, whether the AP can be authenticated, so as to attempt to authenticate validity of the AP, thereby improving security of accessing an AP hotspot of a WLAN by the terminal.

In a possible implementation, before the determining, by a terminal, an AP feature according to a feature generation rule corresponding to an access point AP of a wireless local area network WLAN, the feature generation rule corresponding to the AP is obtained from a server configured to manage the AP. In this implementation, the server configured to manage the AP is set to manage all feature generation rules corresponding to the AP.

In a possible implementation, a specific process of the determining, by the terminal according to the response message and the determined AP feature, whether the AP can be authenticated is as follows: determining, by the terminal, whether the response message includes an AP feature; and if the response message includes no AP feature, determining, by the terminal, that the AP fails to be authenticated, or if the response message includes an AP feature, and the terminal determines that the AP feature included in the response message is the same as the determined AP feature, determining, by the terminal, that the AP can be authenticated.

In a possible implementation, if the terminal determines that the AP feature included in the response message is different from the determined AP feature, determining, by the terminal, that the AP fails to be authenticated; or if the terminal determines that the AP feature included in the response message is different from the determined AP feature, and determines that duration for which the feature generation rule has been obtained by means of an update does not exceed a specified threshold, determining, by the terminal, whether the AP feature included in the response message is the same as an AP feature determined according to a feature generation rule prior to the update; and if the AP feature included in the response message is the same as the AP feature determined according to the feature generation rule prior to the update, determining that the AP can be authenticated, or if the AP feature included in the response message is different from the AP feature determined according to the feature generation rule prior to the update, determining that the AP fails to be authenticated.

In a possible implementation, the AP feature included in the response message is configured for the AP by the server configured to manage the AP after being determined, according to the feature generation rule corresponding to the AP, by the server configured to manage the AP. In this implementation, the server configured to manage the AP directly configures an AP feature for the AP, and this can simplify calculation complexity of an AP side, and improve data transmission efficiency.

In a possible implementation, the AP feature included in the response message is determined by the AP according to the feature generation rule that is corresponding to the AP and that is configured by the server configured to manage the AP. In this implementation, the server configured to manage the AP configures the feature generation rule corresponding to the AP, and this can further improve the security.

In a possible implementation, a specific process of the sending, by the terminal to the AP, a request message for requesting to provide an AP feature, and obtaining a response message that is returned by the AP according to the request message is as follows: sending, by the terminal, a probe request frame to the AP, where a frame body of the probe request frame carries a special service set identifier SSID, and the special SSID is used to request the AP to provide an AP feature; and receiving, by the terminal, a probe response frame returned by the AP, where a frame body of the probe response frame includes the special SSID and a supported rates field corresponding to the special SSID, and the supported rates field corresponding to the special SSID carries an AP feature provided by the AP or is null. In this implementation, an AP feature may be obtained from the AP by using an existing probe request frame and probe response frame, and there is no need to modify frame structures of the existing probe request frame and probe response frame.

In a possible implementation, a specific process of the sending, by the terminal to the AP, a request message for requesting to provide an AP feature, and obtaining a response message that is returned by the AP according to the request message is as follows: sending, by the terminal, a Dynamic Host Configuration Protocol DHCP packet to the AP, where the DHCP packet includes an options extension field whose value is a preset value, and the options extension field whose value is the preset value is used to request the AP to provide an AP feature; and receiving, by the terminal, a DHCP response packet returned by the AP, where an options extension field whose value is the preset value and that is in the DHCP response packet carries an AP feature provided by the AP or is null. In this implementation, an AP feature may be obtained from the AP by using an existing Dynamic Host Configuration Protocol DHCP packet, and there is no need to modify a packet structure.

In a possible implementation, the feature generation rule corresponding to the AP is updated by the server configured to manage the AP. In this implementation, the server configured to manage the AP updates the feature generation rule corresponding to the AP, and this can further improve the security.

According to a second aspect, an embodiment of the present invention provides an access point AP authentication method, where the method includes:

receiving, by an access point AP of a wireless local area network WLAN, a request message that is for requesting to provide an AP feature and that is sent by a terminal; and returning, by the AP, a response message to the terminal according to the request message.

In this embodiment, the AP returns the response message to the terminal according to the request message that is for requesting to provide an AP feature and that is of the terminal, and the terminal determines, according to the response message and an AP feature determined according to a feature generation rule corresponding to the AP, whether the AP can be authenticated, so as to attempt to authenticate validity of the AP, thereby improving security of accessing an AP hotspot of the WLAN by the terminal.

In a possible implementation, the AP receives an AP feature configured by a server configured to manage the AP. In this implementation, the server configured to manage the AP directly configures an AP feature for the AP, and this can simplify calculation complexity of an AP side, and improve data transmission efficiency.

In a possible implementation, the AP receives a feature generation rule configured by a server configured to manage the AP, and determines an AP feature according to the feature generation rule. In this implementation, the server configured to manage the AP configures the feature generation rule for the AP, and this can further improve the security.

In a possible implementation, the AP receives a probe request frame sent by the terminal, where a frame body of the probe request frame carries a special service set identifier SSID, and the special SSID is used to request the AP to provide an AP feature; and the AP returns a probe response frame to the terminal, where a frame body of the probe response frame carries the special SSID and information carried in a supported rates field corresponding to the special SSID, and the supported rates field corresponding to the special SSID carries an AP feature provided by the AP or is null. In this implementation, an AP feature may be obtained from the AP by using an existing probe request frame and probe response frame, and there is no need to modify frame structures of the existing probe request frame and probe response frame.

In a possible implementation, the AP receives a Dynamic Host Configuration Protocol DHCP packet sent by the terminal, where the DHCP packet includes an options extension field whose value is a preset value, and the options extension field whose value is the preset value is used to request the AP to provide an AP feature; and the AP returns a DHCP response packet to the terminal, where an options extension field whose value is the preset value and that is in the DHCP response packet carries an AP feature provided by the AP or is null. In this implementation, an AP feature may be obtained from the AP by using an existing Dynamic Host Configuration Protocol DHCP packet, and there is no need to modify a packet structure.

According to a third aspect, an embodiment of the present invention further provides a wireless local area network WLAN authentication system, including:

a terminal, configured to: determine an AP feature according to a feature generation rule corresponding to an access point AP of a wireless local area network WLAN; send, to the AP, a request message for requesting to provide an AP feature, and obtain a response message that is returned by the AP according to the request message; and determine, according to the response message and the determined AP feature, whether the AP can be authenticated; and the AP, configured to: receive the request message that is for requesting to provide an AP feature and that is sent by the terminal, and return the response message to the terminal according to the request message.

In this embodiment, the terminal determines an AP feature according to the feature generation rule corresponding to the AP, obtains, after sending, to the AP, the request message for requesting to provide an AP feature, the response message returned by the AP, and determines, according to the response message returned by the AP and the determined AP feature, whether the AP can be authenticated, so as to attempt to authenticate validity of the AP, thereby improving security of accessing an AP hotspot of a WLAN by the terminal.

In a possible implementation, the WLAN authentication system further includes a server configured to manage the AP, and the server configured to manage the AP is configured to provide the terminal with the feature generation rule corresponding to the AP. In this implementation, the server configured to manage the AP is set to manage all feature generation rules corresponding to the AP.

In a possible implementation, the WLAN authentication system further includes a server configured to manage the AP, and the server configured to manage the AP is configured to configure an AP feature for the AP. In this implementation, the server configured to manage the AP directly configures an AP feature for the AP, and this can simplify calculation complexity of an AP side, and improve data transmission efficiency.

In a possible implementation, the WLAN authentication system further includes a server configured to manage the AP, and the server configured to manage the AP is configured to configure a feature generation rule for the AP; and the AP is further configured to determine an AP feature according to the feature generation rule configured by the server configured to manage the AP. In this implementation, the server configured to manage the AP configures the feature generation rule corresponding to the AP, and this can further improve the security.

According to a fourth aspect, an embodiment of the present invention further provides a terminal, including:

a processing module, configured to determine an AP feature according to a feature generation rule corresponding to an access point AP of a wireless local area network WLAN;

a communication module, configured to: send, to the AP, a request message for requesting to provide an AP feature, and obtain a response message that is returned by the AP according to the request message; and an authentication module, configured to determine, according to the response message obtained by the communication module and the AP feature determined by the processing module, whether the AP can be authenticated.

In this embodiment, the terminal determines an AP feature according to the feature generation rule corresponding to the AP, obtains, after sending, to the AP, the request message for requesting to provide an AP feature, the response message returned by the AP, and determines, according to the response message returned by the AP and the determined AP feature, whether the AP can be authenticated, so as to attempt to authenticate validity of the AP, thereby improving security of accessing an AP hotspot of a WLAN by the terminal.

In a possible implementation, the communication module obtains, from a server configured to manage the AP, the feature generation rule corresponding to the AP. In this implementation, the server configured to manage the AP is set to manage all feature generation rules corresponding to the AP.

In a possible implementation, the authentication module determines whether the response message includes an AP feature; and if the response message includes no AP feature, the authentication module determines that the AP fails to be authenticated, or if the response message includes an AP feature, and it is determined that the AP feature included in the response message is the same as the determined AP feature, the authentication module determines that the AP can be authenticated.

In a possible implementation, if it is determined that the AP feature included in the response message is different from the determined AP feature, the authentication module determines that the AP fails to be authenticated; or if it is determined that the AP feature included in the response message is different from the determined AP feature, and it is determined that duration for which the feature generation rule has been obtained by means of an update does not exceed a specified threshold, the authentication module determines whether the AP feature included in the response message is the same as an AP feature determined according to a feature generation rule prior to the update; and if the AP feature included in the response message is the same as the AP feature determined according to the feature generation rule prior to the update, the authentication module determines that the AP can be authenticated, or if the AP feature included in the response message is different from the AP feature determined according to the feature generation rule prior to the update, the authentication module determines that the AP fails to be authenticated.

In a possible implementation, the AP feature included in the response message is configured for the AP by the server configured to manage the AP after being determined, according to the feature generation rule corresponding to the AP, by the server configured to manage the AP. In this implementation, the server configured to manage the AP directly configures an AP feature for the AP, and this can simplify calculation complexity of an AP side, and improve data transmission efficiency.

In a possible implementation, the AP feature included in the response message is determined by the AP according to the feature generation rule that is corresponding to the AP and that is configured by the server configured to manage the AP. In this implementation, the server configured to manage the AP configures the feature generation rule corresponding to the AP, and this can further improve the security.

In a possible implementation, the communication module sends a probe request frame to the AP, where a frame body of the probe request frame carries a special service set identifier SSID, and the special SSID is used to request the AP to provide an AP feature; and the communication module receives a probe response frame returned by the AP, where a frame body of the probe response frame includes the special SSID and a supported rates field corresponding to the special SSID, and the supported rates field corresponding to the special SSID carries an AP feature provided by the AP or is null. In this implementation, an AP feature may be obtained from the AP by using an existing probe request frame and probe response frame, and there is no need to modify frame structures of the existing probe request frame and probe response frame.

In a possible implementation, the communication module sends a Dynamic Host Configuration Protocol DHCP packet to the AP, where the DHCP packet includes an options extension field whose value is a preset value, and the options extension field whose value is the preset value is used to request the AP to provide an AP feature; and the communication module receives a DHCP response packet returned by the AP, where an options extension field whose value is the preset value and that is in the DHCP response packet carries an AP feature provided by the AP or is null. In this implementation, an AP feature may be obtained from the AP by using an existing Dynamic Host Configuration Protocol DHCP packet, and there is no need to modify a packet structure.

In a possible implementation, the feature generation rule corresponding to the AP is updated by the server configured to manage the AP. In this implementation, the server configured to manage the AP updates the feature generation rule corresponding to the AP, and this can further improve the security.

According to a fifth aspect, an embodiment of the present invention further provides an access point AP, including:

a receiving module, configured to receive a request message that is for requesting to provide an AP feature and that is sent by a terminal; and a sending module, configured to return a response message to the terminal according to the request message received by the receiving module.

In this embodiment, the AP returns the response message to the terminal according to the request message that is for requesting to provide an AP feature and that is of the terminal, and the terminal determines, according to the response message and an AP feature determined according to a feature generation rule corresponding to the AP, whether the AP can be authenticated, so as to attempt to authenticate validity of the AP, thereby improving security of accessing an AP hotspot of a WLAN by the terminal.

In a possible implementation, the receiving module receives an AP feature configured by a server configured to manage the AP. In this implementation, the server configured to manage the AP directly configures an AP feature for the AP, and this can simplify calculation complexity of an AP side, and improve data transmission efficiency.

In a possible implementation, the receiving module receives a feature generation rule configured by a server configured to manage the AP; and the AP further includes a processing module, configured to determine an AP feature according to the feature generation rule received by the receiving module. In this implementation, the server configured to manage the AP configures the feature generation rule for the AP, and this can further improve the security.

In a possible implementation, the receiving module receives a probe request frame sent by the terminal, where a frame body of the probe request frame carries a special service set identifier SSID, and the special SSID is used to request the AP to provide an AP feature; and the receiving module returns a probe response frame to the terminal, where a frame body of the probe response frame carries the special SSID and information carried in a supported rates field corresponding to the special SSID, and the supported rates field corresponding to the special SSID carries an AP feature provided by the AP or is null. In this implementation, an AP feature may be obtained from the AP by using an existing probe request frame and probe response frame, and there is no need to modify frame structures of the existing probe request frame and probe response frame.

In a possible implementation, the receiving module receives a Dynamic Host Configuration Protocol DHCP packet sent by the terminal, where the DHCP packet includes an options extension field whose value is a preset value, and the options extension field whose value is the preset value is used to request the AP to provide an AP feature; and the receiving module returns a DHCP response packet to the terminal, where an options extension field whose value is the preset value and that is in the DHCP response packet carries an AP feature provided by the AP or is null. In this implementation, an AP feature may be obtained from the AP by using an existing Dynamic Host Configuration Protocol DHCP packet, and there is no need to modify a packet structure.

According to a sixth aspect, an embodiment of the present invention further provides a terminal, including a processor, a memory, and a transceiver, where the transceiver is configured to receive and send data under control of the processor, the memory stores a preset program, and the processor reads the program stored in the memory, and executes the following process according to the program:

determining an AP feature according to a feature generation rule corresponding to an access point AP of a wireless local area network WLAN;

sending, to the AP by using the transceiver, a request message for requesting to provide an AP feature, and obtaining, by using the transceiver, a response message that is returned by the AP according to the request message; and determining, according to the response message returned by the AP and the determined AP feature, whether the AP can be authenticated.

In this embodiment, the terminal determines an AP feature according to the feature generation rule corresponding to the AP, obtains, after sending, to the AP, the request message for requesting to provide an AP feature, the response message returned by the AP, and determines, according to the response message returned by the AP and the determined AP feature, whether the AP can be authenticated, so as to attempt to authenticate validity of the AP, thereby improving security of accessing an AP hotspot of a WLAN by the terminal.

In a possible implementation, the processor obtains, by using the transceiver from a server configured to manage the AP, the feature generation rule corresponding to the AP. In this implementation, the server configured to manage the AP is set to manage all feature generation rules corresponding to the AP.

In a possible implementation, the processor determines whether the response message includes an AP feature; and if the response message includes no AP feature, the processor determines that the AP fails to be authenticated, or if the response message includes an AP feature, and it is determined that the AP feature included in the response message is the same as the determined AP feature, the processor determines that the AP can be authenticated.

In a possible implementation, if it is determined that the AP feature included in the response message is different from the determined AP feature, the processor determines that the AP fails to be authenticated; or if it is determined that the AP feature included in the response message is different from the determined AP feature, and it is determined that duration for which the feature generation rule has been obtained by means of an update does not exceed a specified threshold, the processor determines whether the AP feature included in the response message is the same as an AP feature determined according to a feature generation rule prior to the update; and if the AP feature included in the response message is the same as the AP feature determined according to the feature generation rule prior to the update, the processor determines that the AP can be authenticated, or if the AP feature included in the response message is different from the AP feature determined according to the feature generation rule prior to the update, the processor determines that the AP fails to be authenticated.

In a possible implementation, the AP feature included in the response message is configured for the AP by the server configured to manage the AP after being determined, according to the feature generation rule corresponding to the AP, by the server configured to manage the AP. In this implementation, the server configured to manage the AP directly configures an AP feature for the AP, and this can simplify calculation complexity of an AP side, and improve data transmission efficiency.

In a possible implementation, the AP feature included in the response message is determined by the AP according to the feature generation rule that is corresponding to the AP and that is configured by the server configured to manage the AP. In this implementation, the server configured to manage the AP configures the feature generation rule corresponding to the AP, and this can further improve the security.

In a possible implementation, the processor sends a probe request frame to the AP by using the transceiver, where a frame body of the probe request frame carries a special service set identifier SSID, and the special SSID is used to request the AP to provide an AP feature; and receives, by using the transceiver, a probe response frame returned by the AP, where a frame body of the probe response frame includes the special SSID and a supported rates field corresponding to the special SSID, and the supported rates field corresponding to the special SSID carries an AP feature provided by the AP or is null. In this implementation, an AP feature may be obtained from the AP by using an existing probe request frame and probe response frame, and there is no need to modify frame structures of the existing probe request frame and probe response frame.

In a possible implementation, the processor sends a Dynamic Host Configuration Protocol DHCP packet to the AP by using the transceiver, where the DHCP packet includes an options extension field whose value is a preset value, and the options extension field whose value is the preset value is used to request the AP to provide an AP feature; and receives, by using the transceiver, a DHCP response packet returned by the AP, where an options extension field whose value is the preset value and that is in the DHCP response packet carries an AP feature provided by the AP or is null. In this implementation, an AP feature may be obtained from the AP by using an existing Dynamic Host Configuration Protocol DHCP packet, and there is no need to modify a packet structure.

In a possible implementation, the feature generation rule corresponding to the AP is updated by the server configured to manage the AP. In this implementation, the server configured to manage the AP updates the feature generation rule corresponding to the AP, and this can further improve the security.

According to a seventh aspect, an embodiment of the present invention further provides an access point AP, including a processor, a memory, and a transceiver, where the transceiver is configured to receive and send data under control of the processor, the memory stores a preset program, and the processor reads the program stored in the memory, and executes the following process according to the program:

receiving, by using the transceiver, a request message that is for requesting to provide an AP feature and that is sent by a terminal; and instructing, according to the request message, the transceiver to return a response message to the terminal.

In this embodiment, the AP returns the response message to the terminal according to the request message that is for requesting to provide an AP feature and that is of the terminal, and the terminal determines, according to the response message and an AP feature determined according to a feature generation rule corresponding to the AP, whether the AP can be authenticated, so as to attempt to authenticate validity of the AP, thereby improving security of accessing an AP hotspot of a WLAN by the terminal.

In a possible implementation, the processor receives, by using the transceiver, an AP feature configured by a server configured to manage the AP. In this implementation, the server configured to manage the AP directly configures an AP feature for the AP, and this can simplify calculation complexity of an AP side, and improve data transmission efficiency.

In a possible implementation, the processor receives, by using the transceiver, a feature generation rule configured by a server configured to manage the AP; and determines an AP feature according to the feature generation rule received by using the transceiver. In this implementation, the server configured to manage the AP configures the feature generation rule for the AP, and this can further improve the security.

In a possible implementation, the processor receives, by using the transceiver, a probe request frame sent by the terminal, where a frame body of the probe request frame carries a special service set identifier SSID, and the special SSID is used to request the AP to provide an AP feature; and returns a probe response frame to the terminal by using the transceiver, where a frame body of the probe response frame carries the special SSID and information carried in a supported rates field corresponding to the special SSID, and the supported rates field corresponding to the special SSID carries an AP feature provided by the AP or is null. In this implementation, an AP feature may be obtained from the AP by using an existing probe request frame and probe response frame, and there is no need to modify frame structures of the existing probe request frame and probe response frame.

In a possible implementation, the processor receives, by using the transceiver, a Dynamic Host Configuration Protocol DHCP packet sent by the terminal, where the DHCP packet includes an options extension field whose value is a preset value, and the options extension field whose value is the preset value is used to request the AP to provide an AP feature; and returns a DHCP response packet to the terminal by using the transceiver, where an options extension field whose value is the preset value and that is in the DHCP response packet carries an AP feature provided by the AP or is null. In this implementation, an AP feature may be obtained from the AP by using an existing Dynamic Host Configuration Protocol DHCP packet, and there is no need to modify a packet structure.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
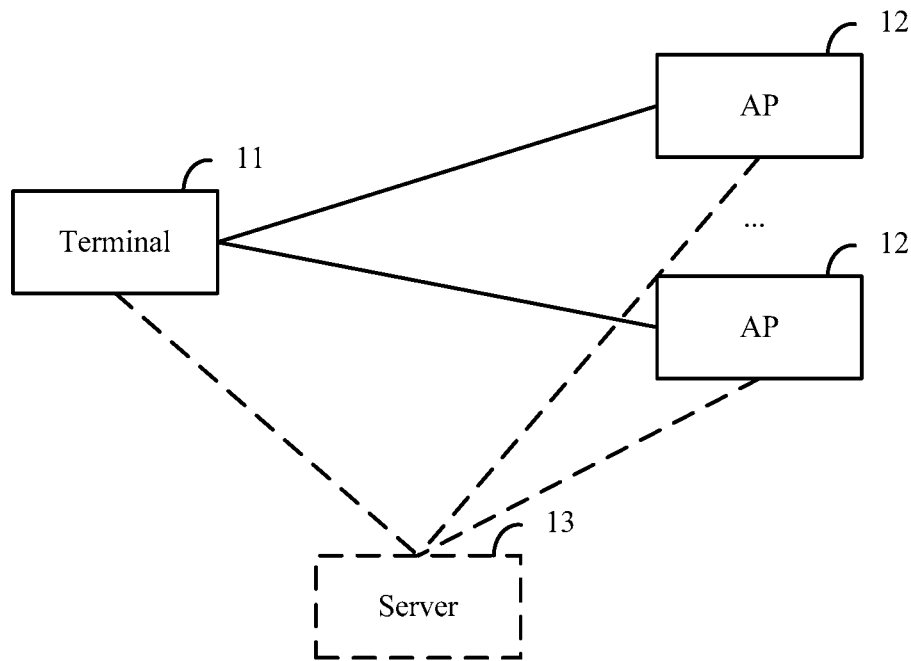
FIG. 1 is a schematic diagram of an architecture of an access point AP authentication system according to an embodiment of the present invention.

As shown in FIG. 1, FIG. 1 is a schematic diagram of an architecture of an access point AP authentication system according to an embodiment of the present invention, and the system includes a terminal 11 and one or more APs 12 of a WLAN, and the terminal has a WLAN communication function. Optionally, the system further includes a server 13 configured to manage the one or more APs 12.

Figure 2:
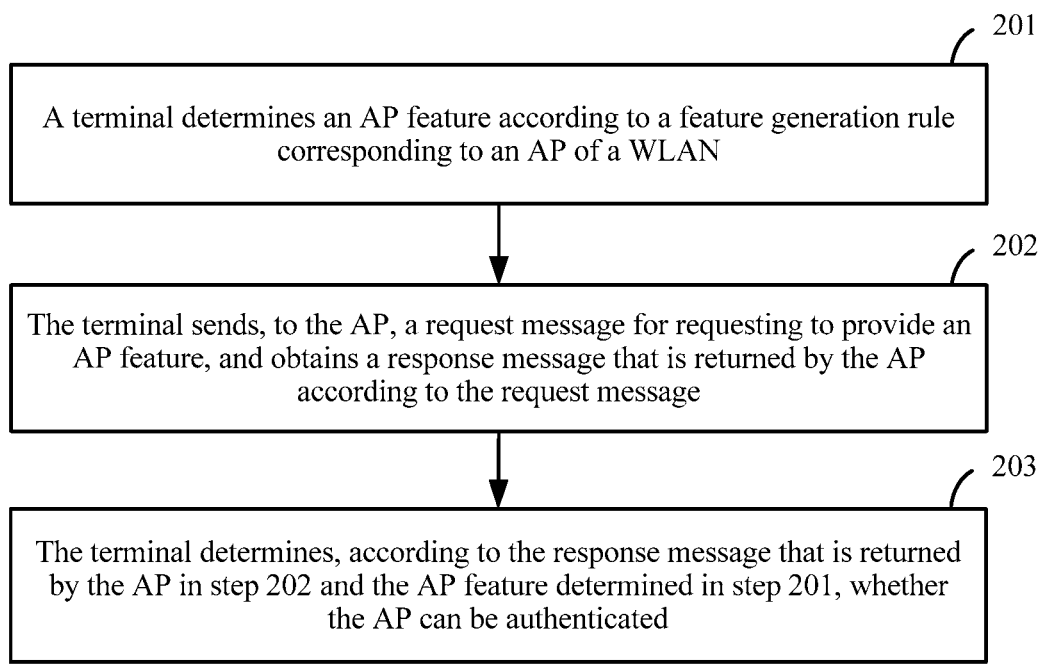
FIG. 2 is a schematic flowchart of a method in which a terminal attempts to authenticate an AP according to an embodiment of the present invention.

Based on the architecture of the system, in this embodiment of the present invention, as shown in FIG. 2, FIG. 2 is a schematic flowchart of a method in which a terminal attempts to authenticate validity of an AP. Details are as follows:

Step 201: The terminal determines an AP feature according to a feature generation rule corresponding to the AP of a WLAN.

During implementation, the feature generation rule corresponding to the AP may be any calculation method in which an output parameter can be obtained by means of calculation according to a specified input parameter, and a specific implementation form of the feature generation rule is not limited in this embodiment of the present invention. Specifically, the feature generation rule specifies a calculation rule and an input parameter used for the calculation. It should be ensured that with the feature generation rule, output results are the same provided that input parameters are the same.

For example, the feature generation rule is specifically as follows: A new character string is obtained after character string concatenation is performed on a preset password and an SSID of the AP, and the new character string is the AP feature. Alternatively, the feature generation rule is specifically as follows: A rounded result obtained after a numerical part included in a preset password is divided by an ASCII code value of an SSID of the AP is used as the AP feature.

During implementation, the terminal obtains the feature generation rule corresponding to the AP in multiple manners, and the following two specific implementations are listed. It should be noted that the following two specific implementations herein are merely examples for description, and another manner of obtaining the feature generation rule corresponding to the AP is not excluded.

In a first implementation, the feature generation rule corresponding to the AP is pre-configured on the terminal.

Specifically, a correspondence between the SSID of the AP and the feature generation rule is pre-configured on the terminal.

During implementation, after finding an SSID of a specific AP, the terminal obtains, according to the SSID of the AP from a pre-configured correspondence between the SSID of the AP and a feature generation rule, the feature generation rule corresponding to the SSID of the AP.

In an actual application, a feature generation rule corresponding to an AP of each operator may already be configured on the terminal at delivery.

In this implementation, there are the following two configuration manners on an AP side:

Configuration manner a: A feature generation rule same as that on a terminal side needs to be configured on the AP side, so as to ensure that feature generation rules used by the terminal side and the AP side are the same. A feature generation rule configured for the AP may be pre-configured at delivery, or may be configured by using a server configured to manage the AP.

Configuration manner b: An AP feature that is determined by using a feature generation rule configured on the terminal needs to be used on the AP side, so as to ensure that an AP feature provided by the AP is the same as an AP feature obtained by the terminal by means of calculation. The AP feature configured for the AP may be pre-configured at delivery, or may be configured by using the server configured to manage the AP.

In a second implementation, the terminal obtains the feature generation rule that is corresponding to the AP and that is provided by the server configured to manage the AP.

In this implementation, there may be the following two specific configuration manners according to different configuration manners of the AP:

Configuration manner a: The server configured to manage the AP generates the feature generation rule corresponding to the managed AP, and separately configures the feature generation rule for the terminal and the managed AP.

Specifically, the server configured to manage the AP selects a feature generation rule from a feature generation rule pool, and validates the selected feature generation rule.

In this configuration manner, the server configured to manage the AP may periodically or aperiodically update the feature generation rule corresponding to the AP, and configure the updated feature generation rule corresponding to the AP for the terminal and the managed AP. After obtaining the updated feature generation rule that is corresponding to the AP and that is provided by the server configured to manage the AP, the terminal updates the locally stored feature generation rule that is corresponding to the AP and that has been updated. The AP managed by the server uses the updated feature generation rule to update the locally stored feature generation rule.

Configuration manner b: The server configured to manage the AP generates the feature generation rule corresponding to the managed AP, and obtains the AP feature according to the feature generation rule by means of calculation, configures the feature generation rule for the terminal, and configures the AP feature obtained by means of calculation for the AP.

Specifically, the server configured to manage the AP configures the AP feature for the managed AP by using a trusted management network.

In this configuration manner, the server configured to manage the AP may periodically or aperiodically update the feature generation rule corresponding to the AP, and configure the updated feature generation rule corresponding to the AP for the terminal, and obtain, by means of calculation, an updated AP feature according to the updated feature generation rule corresponding to the AP, and update, by using the updated AP feature, the AP feature configured for the AP.

Specifically, in the foregoing configuration manners, if APs managed by the server configured to manage the APs belong to different SSIDs, the server configured to manage the APs configures a same feature generation rule or a same AP feature for APs that have a same SSID.

Step 202: The terminal sends, to the AP, a request message for requesting to provide an AP feature, and obtains a response message that is returned by the AP according to the request message.

A specific implementation in which the terminal requests the AP to provide an AP feature and obtains the response message returned by the AP is not limited in this embodiment of the present invention, provided that the terminal and the AP mutually agree on a transmitted message and a message parsing manner.

In this embodiment of the present invention, a manner for obtaining information about the AP feature includes but is not limited to the following two implementations:

In a first implementation, the terminal and the AP agree to use a probe request frame (Probe Request Frame) and a probe response frame (Probe Response Frame) for implementation.

Specifically, the terminal sends a probe request frame to the AP. A frame body of the probe request frame carries a special SSID, and the special SSID is used to request the AP to provide an AP feature. The terminal receives a probe response frame returned by the AP. A frame body of the probe response frame includes the special SSID and a supported rates (support rate) field corresponding to the special SSID, and the supported rates field corresponding to the special SSID carries an AP feature provided by the AP or is null.

In this specific implementation, there is no need to change an existing communication manner and an existing communication message structure between the terminal and the AP, and the terminal and the AP only need to agree on a special SSID, so that a pair including this special SSID and a supported rate in an existing communication message between the terminal and the AP can be used to transmit the AP feature.

In a second implementation, a DHCP packet and a DHCP response packet are used between the terminal and the AP for implementation.

Specifically, the terminal sends a Dynamic Host Configuration Protocol (Dynamic Host Configuration Protocol, DHCP) packet to the AP. The DHCP packet includes an options (Options) extension field whose value is a preset value, and the options extension field whose value is the preset value is used to request the AP to provide an AP feature. The terminal receives a DHCP response packet returned by the AP. An options extension field whose value is the preset value and that is in the DHCP response packet carries an AP feature provided by the AP or is null.

In this specific implementation, there is no need to change an existing communication manner and an existing communication message structure between the terminal and the AP, and the terminal and the AP only need to agree on an options extension field whose value is the preset value and that is in a DHCP packet, so that the options extension field in the existing DHCP packet between the terminal and the AP can be used to transmit the AP feature.

Step 203: The terminal determines, according to the response message returned by the AP in step 202 and the AP feature determined in step 201, whether the AP can be authenticated.

The AP feature is an identifier used to indicate validity of the AP.

During implementation, the terminal determines whether the response message returned by the AP includes an AP feature; and if the response message returned by the AP includes no AP feature, the terminal determines that the AP fails to be authenticated, or if the response message returned by the AP includes an AP feature, and the terminal determines that the AP feature included in the response message returned by the AP is the same as the AP feature determined by the terminal, the terminal determines that the AP can be authenticated.

In an optional implementation, if the terminal determines that the AP feature included in the response message returned by the AP is different from the determined AP feature, the terminal determines that the AP fails to be authenticated.

In another optional implementation, when the terminal updates the feature generation rule corresponding to the AP, if the terminal determines that the AP feature included in the response message returned by the AP is different from the determined AP feature, and determines that duration for which the feature generation rule has been obtained by means of an update does not exceed a specified threshold, the terminal determines whether the AP feature included in the response message returned by the AP is the same as an AP feature determined according to a feature generation rule prior to the update; and if the AP feature included in the response message returned by the AP is the same as the AP feature determined according to the feature generation rule prior to the update, the terminal determines that the AP can be authenticated, or if the AP feature included in the response message returned by the AP is different from the AP feature determined according to the feature generation rule prior to the update, the terminal determines that the AP fails to be authenticated. In this implementation, a determining error in a critical situation caused by feature generation rule switching can be avoided.

In this embodiment of the present invention, the AP feature may be one or a combination of a number, a character string, or the like, and the AP feature is used to identify a trusted AP in a WLAN system. For example, the AP feature is "123456".

Figure 3A:
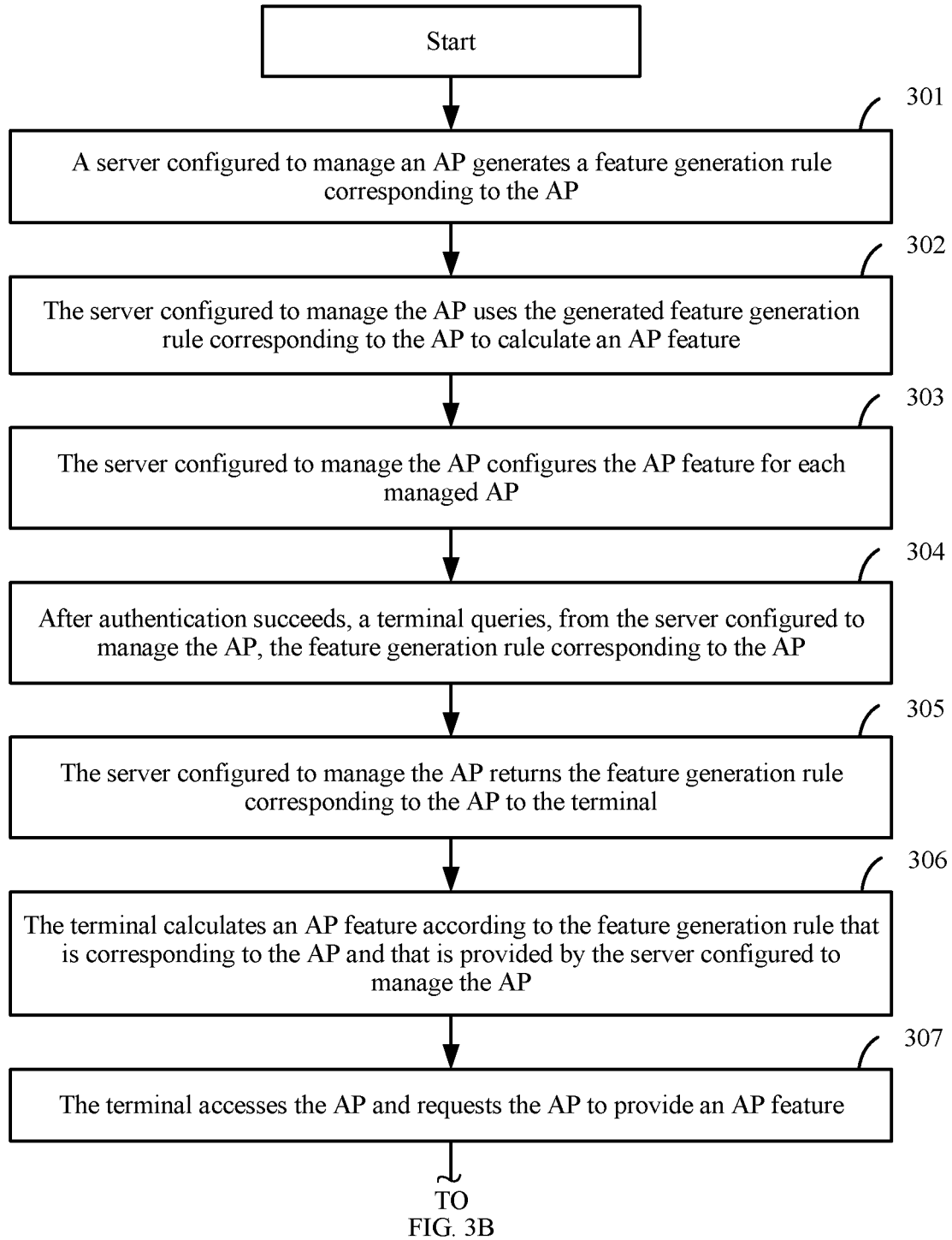
FIG. 3A and FIG. 3B are a schematic flowchart of a method in which a terminal attempts to authenticate validity of an AP according to an embodiment of the present invention.
Figure 3B:
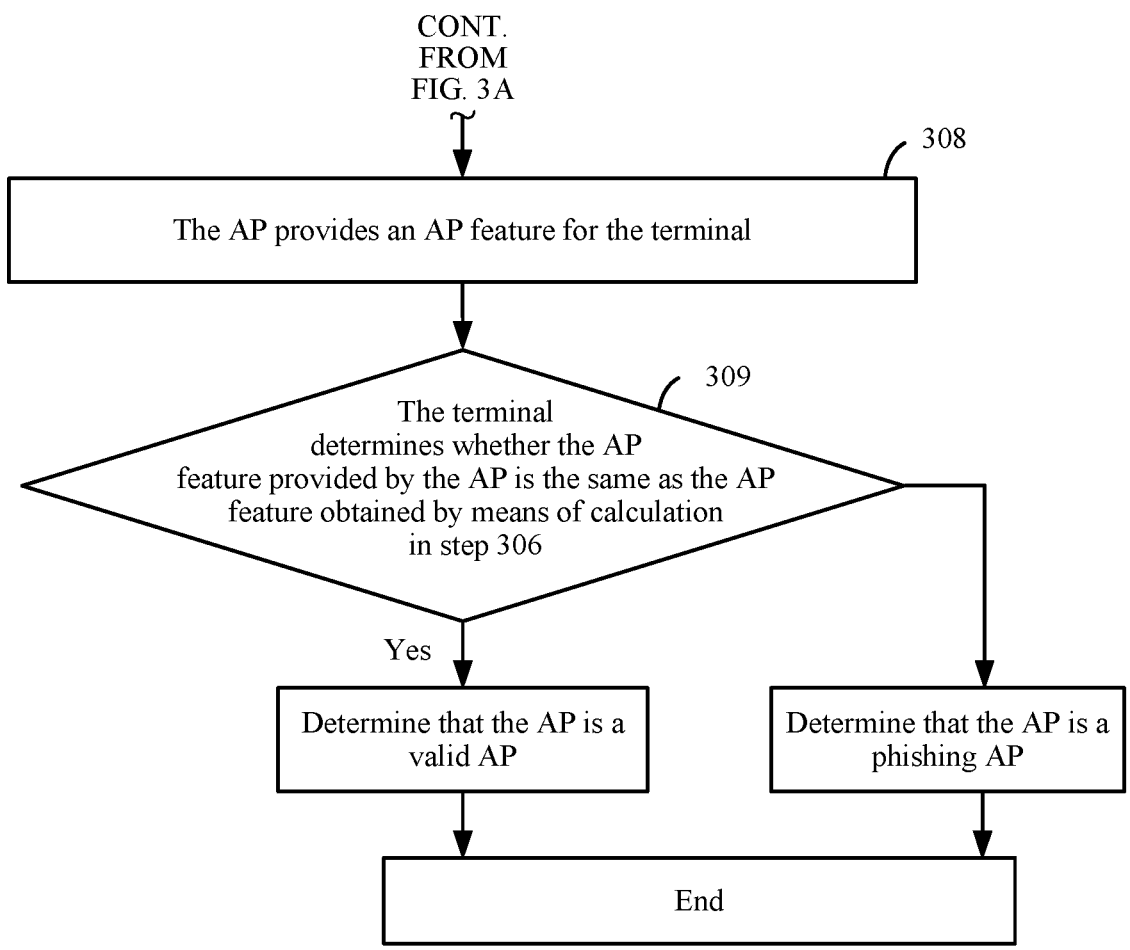

The following uses a specific embodiment as an example to describe a process in which a terminal attempts to authenticate validity of an AP. As shown in FIG. 3A and FIG. 3B, FIG. 3A and FIG. 3B are schematic flowcharts of a method in which the terminal attempts to authenticate the validity of the AP. Details are as follows:

Step 301: A server configured to manage the AP generates a feature generation rule corresponding to the AP, for example, the feature generation rule corresponding to the AP is as follows: The last 6 bits of a product are used as an AP feature, and the product is obtained by multiplying a current date by a product obtained by multiplying ASCII characters corresponding to characters in a password agreed on by the terminal and the server.

Step 302: The server configured to manage the AP uses the generated feature generation rule corresponding to the AP to calculate an AP feature.

Step 303: The server configured to manage the AP configures the AP feature for each managed AP. In addition, the server configured to manage the AP calculates, at 00:00 each day, a new AP feature according to the feature calculation rule, and updates and configures the AP feature for each managed AP.

Step 304: After authentication succeeds, the terminal queries, from the server configured to manage the AP, the feature generation rule corresponding to the AP.

Step 305: The server configured to manage the AP returns the feature generation rule corresponding to the AP to the terminal.

Step 306: The terminal calculates an AP feature according to the feature generation rule that is corresponding to the AP and that is provided by the server configured to manage the AP.

Step 307: The terminal accesses the AP and requests the AP to provide an AP feature.

Step 308: The AP provides an AP feature for the terminal.

Step 309: The terminal determines whether the AP feature provided by the AP is the same as the AP feature obtained by means of calculation in step 306; and if the AP feature provided by the AP is different from the AP feature obtained by means of calculation in step 306, the terminal determines that the AP is a phishing AP, and the authentication fails; or if the AP feature provided by the AP is the same as the AP feature obtained by means of calculation in step 306, the terminal determines that the AP is a valid AP, and the authentication succeeds.

Figure 4A:
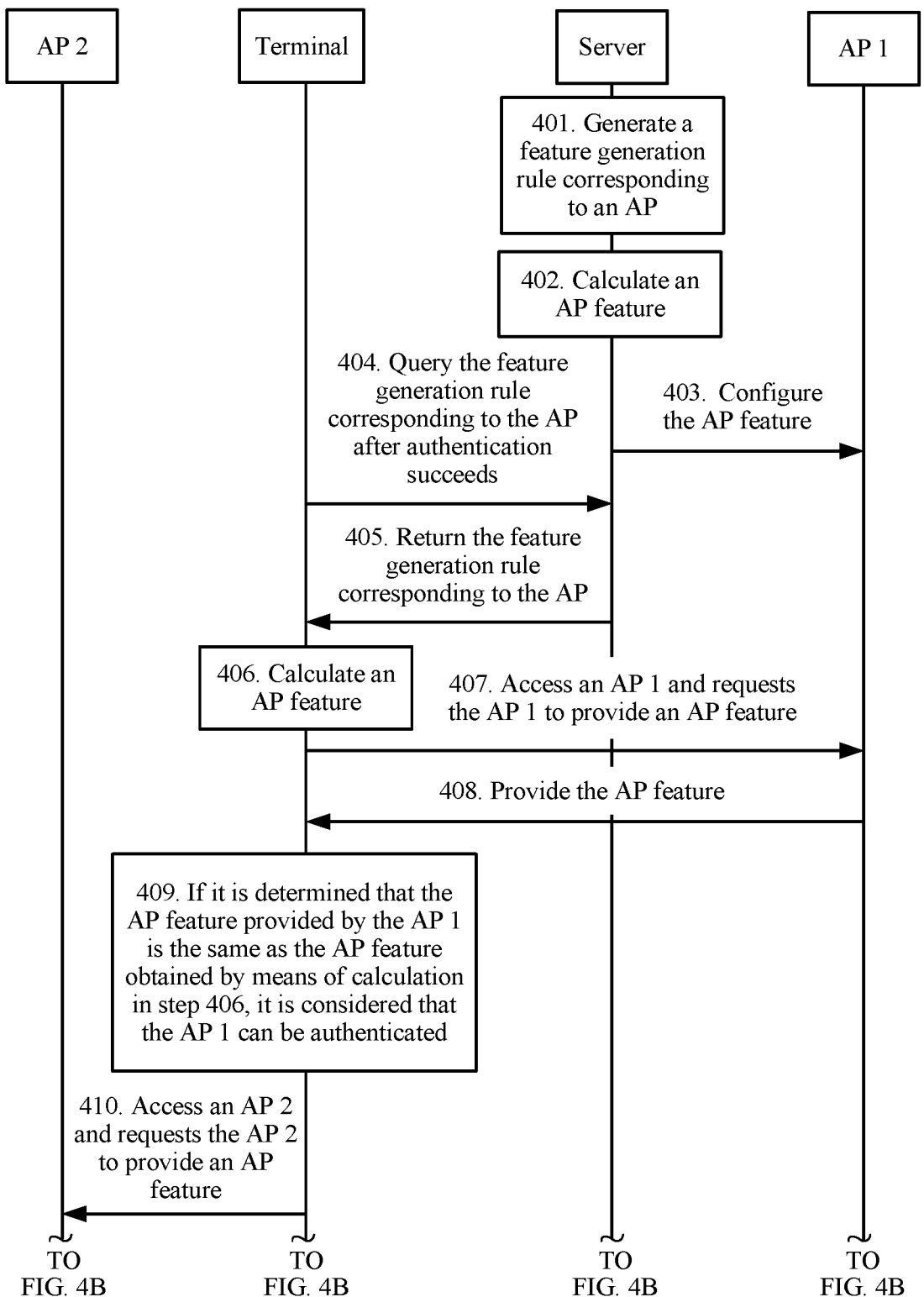
FIG. 4A and FIG. 4B are schematic diagram of a process in which a terminal attempts to authenticate an AP in a specific scenario according to an embodiment of the present invention.
Figure 4B:
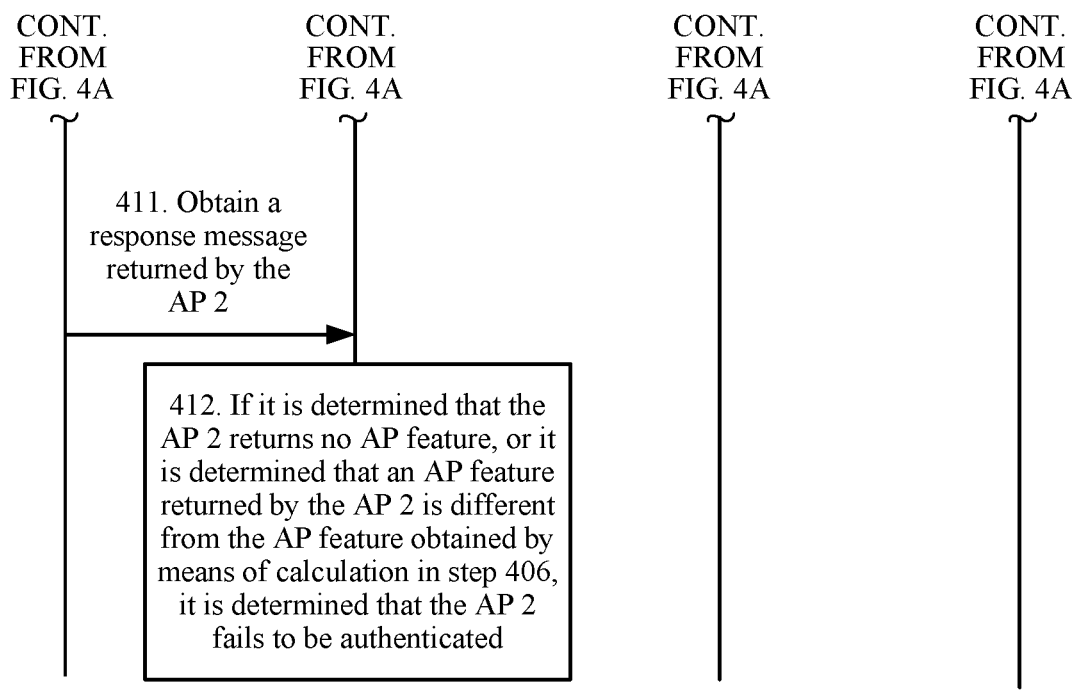

Based on the authentication process provided in this specific embodiment, as shown in FIG. 4A and FIG. 4B, FIG. 4A and FIG. 4B are schematic diagrams of a process in which a terminal attempts to authenticate an AP in a specific scenario. An AP 1 is a valid AP managed by a server configured to manage the AP, an AP 2 is a phishing AP, and the AP 2 is set to have a same SSID as the AP 1. A process in which the terminal attempts to authenticate validity is as follows:

A process in which the server configured to manage the AP 1 provides the terminal with a feature generation rule corresponding to the AP 1 and a process in which the server configured to manage the AP 1 configures an AP feature for the AP 1 described in step 401 to step 406 are the same as the processes described in step 301 to step 306, and details are not repeated herein.

A process in which the terminal attempts to authenticate the AP 1 and the AP 2 is as follows:

Step 407: The terminal accesses the AP 1 and requests the AP 1 to provide an AP feature.

Step 408: The terminal obtains an AP feature returned by the AP 1.

Step 409: If the terminal determines that the AP feature provided by the AP 1 is the same as the AP feature obtained by means of calculation in step 406, the terminal considers that the AP 1 can be authenticated, that is, determines that the AP 1 is a trusted AP.

Step 410: The terminal accesses the AP 2 and requests the AP 2 to provide an AP feature.

Step 411: The terminal obtains information returned by the AP 2.

Step 412: If the terminal determines that the AP 2 returns no AP feature, or determines that an AP feature returned by the AP 2 is different from the AP feature obtained by means of calculation in step 406, the terminal determines that the AP 2 fails to be authenticated, that is, determines that the AP 2 is an untrusted AP, that is, a phishing AP.

Figure 5:
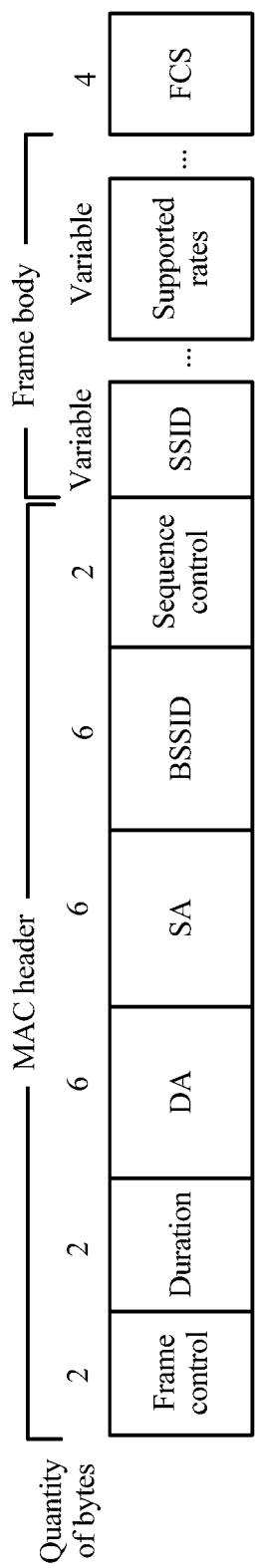
FIG. 5 is a schematic structural diagram of a probe request frame according to an embodiment of the present invention.
Figure 6:
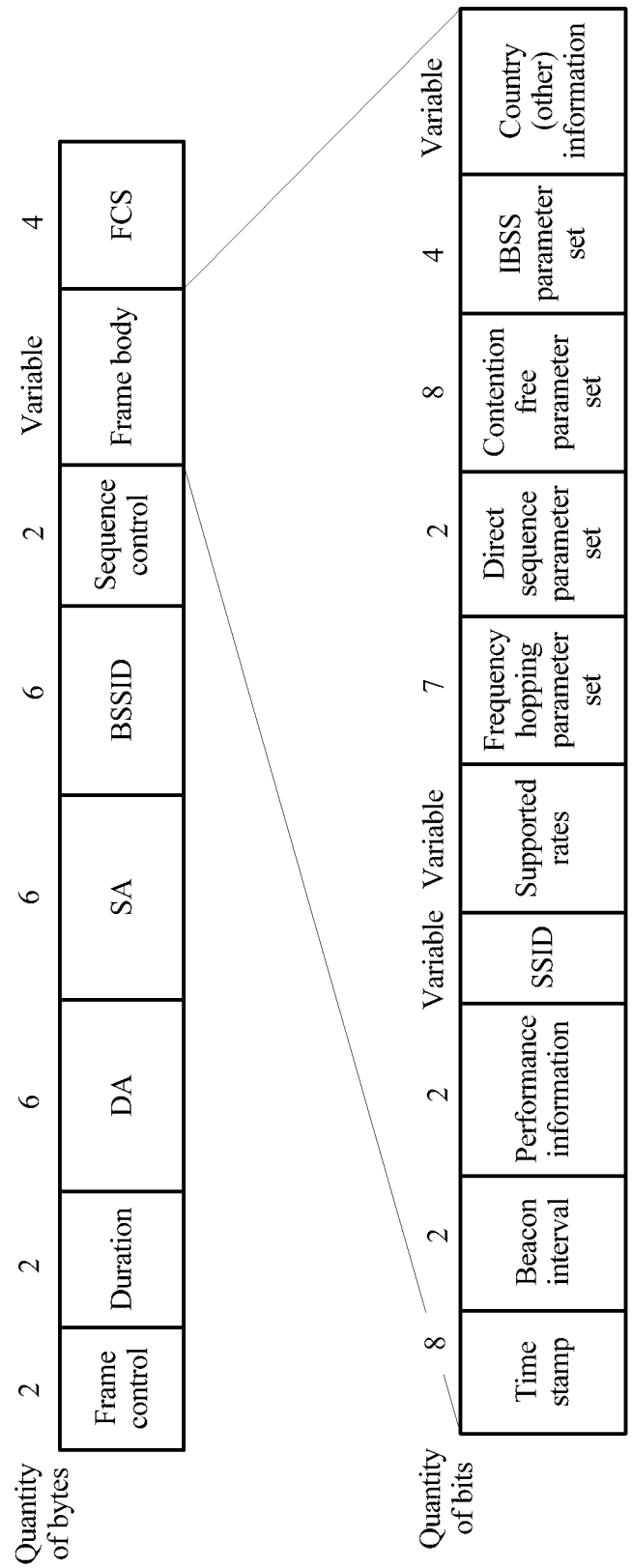
FIG. 6 is a schematic structural diagram of a probe response frame according to an embodiment of the present invention.

Specifically, in step 407 and step 408, the terminal uses extension fields in a probe request frame and a probe response frame that are in a WLAN bottom layer protocol for implementation. Specifically, a pair including an SSID and a supported rate is newly added to a frame body (Frame Body) part of the probe request frame. The terminal sends a probe request frame to the AP by including a random value in a supported rates field in an extended pair including an SSID and a supported rate in a frame body of the probe request frame. The AP returns a probe response frame to the terminal by including a value of the AP feature in a supported rates field in an extended pair including an SSID and a supported rate in a frame body of the probe response frame, for example, "123456". The terminal receives the probe response frame returned by the AP, and extracts the value, of the AP feature, carried in the supported rates field in the extended pair including the SSID and the supported rate in the frame body of the probe response frame. As shown in FIG. 5, FIG. 5 is a schematic structural diagram of a probe request frame of the WLAN bottom layer protocol. As shown in FIG. 6, FIG. 6 is a schematic structural diagram of a probe response frame of the WLAN bottom layer protocol.

Specifically, in step 407 and step 408, an options (options) extension field in a DHCP packet at a bottom layer of TCP/IP may also be used for implementation, and the options extension field in the DHCP packet may be used to store control information and a parameter that are not defined in a general protocol. Specifically, an options extension field is defined in a DHCP packet, and the terminal and the AP agree to use this field to transmit a value of the AP feature. The terminal sends a DHCP packet to the AP, and an options extension field in the DHCP packet is a preset value, for example, 250. The AP returns a DHCP response packet to the terminal, and the DHCP response packet carries, in an options extension field corresponding to the preset value, the value of the AP feature. The terminal receives the DHCP response packet returned by the AP, and obtains the value that is of the AP feature and that is carried in the options extension field corresponding to the preset value in the DHCP response packet.

Figure 7:
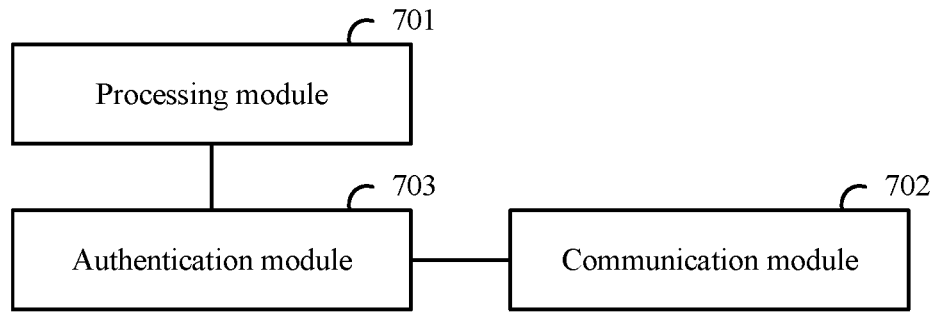
FIG. 7 is a schematic structural diagram of a terminal according to an embodiment of the present invention.

Based on a same invention concept, an embodiment of the present invention provides a terminal. For a specific implementation of the terminal, refer to some descriptions of the foregoing method embodiments, and no repeated description is provided. As shown in FIG. 7, the terminal mainly includes:

a processing module 701, configured to determine an AP feature according to a feature generation rule corresponding to an access point AP of a wireless local area network WLAN;

a communication module 702, configured to: send, to the AP, a request message for requesting to provide an AP feature, and obtain a response message that is returned by the AP according to the request message; and an authentication module 703, configured to determine, according to the response message obtained by the communication module 702 and the AP feature determined by the processing module 701, whether the AP can be authenticated.

For a specific implementation of the processing module 701, refer to some specific descriptions of step 201 in the foregoing method embodiment; for a specific implementation of the communication module 702, refer to some specific descriptions of step 202 in the foregoing method embodiment; and for a specific implementation of the authentication module, refer to some specific descriptions of step 203 in the foregoing method embodiment, and details are not described herein again.

Figure 8:
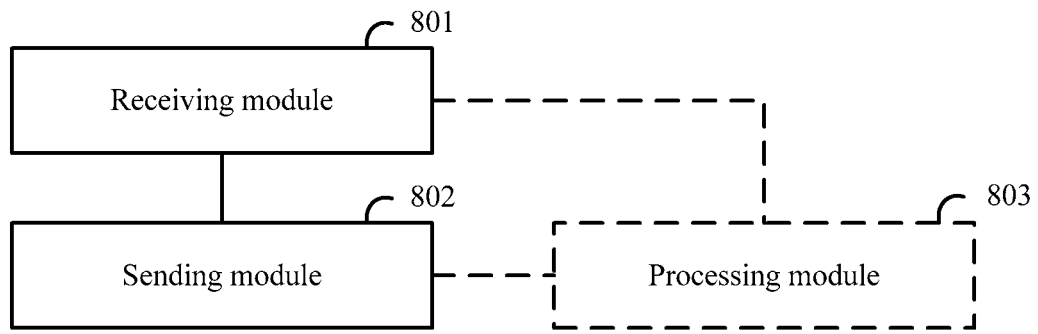
FIG. 8 is a schematic structural diagram of an AP according to an embodiment of the present invention.

Based on a same invention concept, an embodiment of the present invention provides an AP. For a specific implementation of the AP, refer to some descriptions of the foregoing method embodiments, and no repeated description is provided. As shown in FIG. 8, the AP mainly includes:

a receiving module 801, configured to receive a request message that is for requesting to provide an AP feature and that is sent by a terminal; and a sending module 802, configured to return a response message to the terminal according to the request message received by the receiving module 801.

In an implementation, the AP further includes a processing module 803.

Specifically, the receiving module 801 is configured to receive an AP feature sent by a server configured to manage the AP; and the processing module 803 is configured to store the AP feature received by the receiving module 801. The processing module 803 is configured to: obtain the stored AP feature according to the request message received by the receiving module 801, and return the AP feature to the terminal by using the sending module 802.

Specifically, the receiving module 801 is configured to receive a feature generation rule sent by a server configured to manage the AP; and the processing module determines an AP feature according to the feature generation rule received by the receiving module, and stores the AP feature. The processing module 803 is configured to: obtain the stored AP feature according to the request message received by the receiving module 801, and return the AP feature to the terminal by using the sending module 802.

Figure 9:
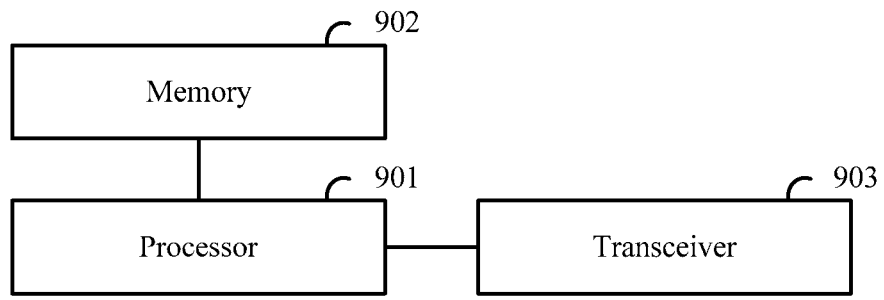
FIG. 9 is a schematic structural diagram of another terminal according to an embodiment of the present invention.

Based on a same invention concept, an embodiment of the present invention further provides another terminal. For a specific implementation of the terminal, refer to some descriptions of the foregoing method embodiments, and no repeated description is provided. As shown in FIG. 9, the terminal mainly includes a processor 901, a memory 902, and a transceiver 903, and the transceiver 903 is configured to receive and send data under control of the processor 901, the memory 902 stores a preset program, and the processor 901 reads the program stored in the memory 902, and executes the following process according to the program:

determining an AP feature according to a feature generation rule corresponding to an access point AP of a wireless local area network WLAN;

sending, to the AP by using the transceiver 903, a request message for requesting to provide an AP feature, and obtaining, by using the transceiver 903, a response message that is returned by the AP according to the request message; and determining, according to the response message returned by the AP and the determined AP feature, whether the AP can be authenticated.

The processor is configured to implement functions of the processing module 701 and the authentication module 703 of the terminal shown in FIG. 7, and the transceiver implements, under control of the processor, a function of the communication module 702 of the terminal shown in FIG. 7, and details are not described herein again.

Figure 10:
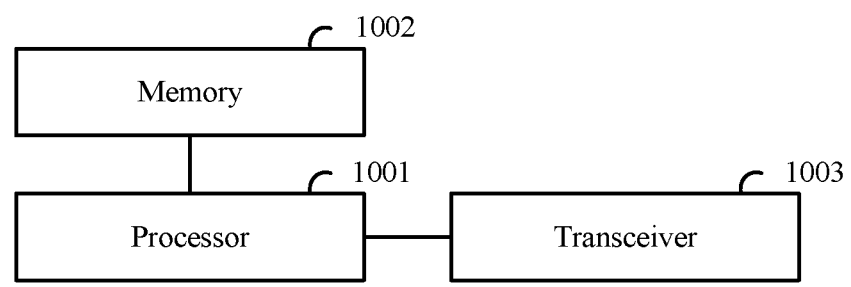
FIG. 10 is a schematic structural diagram of another AP according to an embodiment of the present invention.

Based on a same invention concept, an embodiment of the present invention further provides another AP. For a specific implementation of the AP, refer to some descriptions of the foregoing method embodiments, and no repeated description is provided. As shown in FIG. 10, the AP mainly includes a processor 1001, a memory 1002, and a transceiver 1003, and the transceiver 1003 is configured to receive and send data under control of the processor 1001, the memory 1002 stores a preset program, and the processor 1001 reads the program stored in the memory 1002, and executes the following process according to the program:

receiving, by using the transceiver 1003, a request message that is for requesting to provide an AP feature and that is sent by a terminal; and instructing, according to the request message, the transceiver 1003 to return a response message to the terminal.

The processor is configured to control the transceiver 1003 to complete functions of the receiving module and the sending module shown in FIG. 7, and details are not described herein again.

In structures shown in FIG. 9 and FIG. 10, the processor, the memory, and the transceiver may be connected to each other by using a bus. A bus architecture may include any quantity of interconnected buses and bridges, and specifically links together various circuits of one or more processors represented by the processor and a memory represented by the memory. The bus architecture may further link together various other circuits, such as a peripheral device, a voltage stabilizer, and a power management circuit. These are well known in the art. Therefore, this specification provides no further description. A bus interface provides an interface. The transceiver may be multiple components, that is, the transceiver includes a transmitter and a transceiver, and provides a unit configured to communicate with various other apparatuses on a transmission medium. The processor is responsible for managing the bus architecture and general processing, and the memory may store data used when the processor performs an operation.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An access point AP authentication method, comprising:
   determining, by a terminal, a first AP feature according to a feature generation rule corresponding to an access point AP of a wireless local area network WLAN;
   sending, by the terminal to the AP, a request message for requesting to provide an AP feature, and obtaining a response message that is returned by the AP according to the request message;

determining, by the terminal, whether the response message comprises a second AP feature; and if the response message comprises no AP feature, determining, by the terminal, that the AP fails to be authenticated; or if the response message comprises the second AP feature, and the terminal determines that the second AP feature comprised in the response message is the same as the first AP feature, determining, by the terminal, that the AP can be authenticated, if the terminal determines that the second AP feature comprised in the response message is different from the first AP feature, determining, by the terminal, that the AP fails to be authenticated; or if the terminal determines that the second AP feature comprised in the response message is different from the first AP feature, and determines that duration for which the feature generation rule has been obtained by means of an update does not exceed a specified threshold, determining, by the terminal, whether the second AP feature comprised in the response message is the same as a third AP feature determined according to a feature generation rule prior to the update; and if the second AP feature comprised in the response message is the same as the third AP feature determined according to the feature generation rule prior to the update, determining that the AP can be authenticated, or if the second AP feature comprised in the response message is different from the third AP feature determined according to the feature generation rule prior to the update, determining that the AP fails to be authenticated.

2. The method according to claim 1, before the determining, by a terminal, a first AP feature according to a feature generation rule corresponding to an access point AP of a wireless local area network WLAN, the method further comprises:

obtaining, by the terminal from a server configured to manage the AP, the feature generation rule corresponding to the AP.

3. The method according to claim 1, wherein the second AP feature comprised in the response message is configured for the AP by a server configured to manage the AP after being determined, according to the feature generation rule corresponding to the AP, by the server configured to manage the AP; or the second AP feature comprised in the response message is determined by the AP according to the feature generation rule that is corresponding to the AP and that is configured by the server configured to manage the AP.

4. The method according to claim 1, the sending, by the terminal to the AP, a request message for requesting to provide an AP feature, and obtaining a response message that is returned by the AP according to the request message comprises:

sending, by the terminal, a probe request frame to the AP, wherein a frame body of the probe request frame carries a special service set identifier SSID, and the special SSID is used to request the AP to provide an AP feature; and receiving, by the terminal, a probe response frame returned by the AP, wherein a frame body of the probe response frame comprises the special SSID and a supported rates field corresponding to the special SSID, and the supported rates field corresponding to the special SSID carries an AP feature provided by the AP or is null.

5. The method according to claim 1, the sending, by the terminal to the AP, a request message for requesting to provide an AP feature, and obtaining a response message that is returned by the AP according to the request message comprises:

sending, by the terminal, a Dynamic Host Configuration Protocol DHCP packet to the AP, wherein the DHCP packet comprises an options extension field whose value is a preset value, and the options extension field whose value is the preset value is used to request the AP to provide an AP feature; and receiving, by the terminal, a DHCP response packet returned by the AP, wherein an options extension field whose value is the preset value and that is in the DHCP response packet carries an AP feature provided by the AP or is null.

6. The method according to claim 2, wherein the feature generation rule corresponding to the AP is updated by the server configured to manage the AP.

7. A terminal, comprising a processor, a memory, and a transceiver, wherein the transceiver is configured to receive and send data under control of the processor, the memory stores a preset program, and the processor reads the program stored in the memory, and executes the following process according to the program:

determining a first AP feature according to a feature generation rule corresponding to an access point AP of a wireless local area network WLAN;

sending, to the AP by using the transceiver, a request message for requesting to provide an AP feature, and obtaining, by using the transceiver, a response message that is returned by the AP according to the request message; and determining, according to the response message returned by the AP and the determined first AP feature, whether the AP can be authenticated, wherein the processor is specifically configured to:

determine whether the response message comprises a second AP feature; and if the response message comprises no AP feature, determine that the AP fails to be authenticated; or if the response message comprises the second AP feature, and it is determined that the second AP feature comprised in the response message is the same as the first AP feature, determine that the AP can be authenticated, if it is determined that the second AP feature comprised in the response message is different from the first AP feature, determine that the AP fails to be authenticated; or if it is determined that the second AP feature comprised in the response message is different from the first AP feature, and it is determined that duration for which the feature generation rule has been obtained by means of an update does not exceed a specified threshold, determine whether the second AP feature comprised in the response message is the same as a third AP feature determined according to a feature generation rule prior to the update; and if the second AP feature comprised in the response message is the same as the third AP feature determined according to the feature generation rule prior to the update, determine that the AP can be authenticated, or if the second AP feature comprised in the response message is different from the third AP feature determined according to the feature generation rule prior to the update, determine that the AP fails to be authenticated.

8. The terminal according to claim 7, wherein the processor is further configured to obtain, by using the transceiver from a server configured to manage the AP, the feature generation rule corresponding to the AP.

9. The terminal according to claim 7, wherein the second AP feature comprised in the response message is configured for the AP by a server configured to manage the AP after being determined, according to the feature generation rule corresponding to the AP, by the server configured to manage the AP; or the second AP feature comprised in the response message is determined by the AP according to the feature generation rule that is corresponding to the AP and that is configured by the server configured to manage the AP.

10. The terminal according to claim 7, wherein the processor is specifically configured to:

send a probe request frame to the AP by using the transceiver, wherein a frame body of the probe request frame carries a special service set identifier SSID, and the special SSID is used to request the AP to provide an AP feature; and receive, by using the transceiver, a probe response frame returned by the AP, wherein a frame body of the probe response frame comprises the special SSID and a supported rates field corresponding to the special SSID, and the supported rates field corresponding to the special SSID carries an AP feature provided by the AP or is null.

11. The terminal according to claim 7, wherein the processor is specifically configured to:

send a Dynamic Host Configuration Protocol DHCP packet to the AP by using the transceiver, wherein the DHCP packet comprises an options extension field whose value is a preset value, and the options extension field whose value is the preset value is used to request the AP to provide an AP feature; and receive, by using the transceiver, a DHCP response packet returned by the AP, wherein an options extension field whose value is the preset value and that is in the DHCP response packet carries an AP feature provided by the AP or is null.

12. The terminal according to claim 8, wherein the feature generation rule corresponding to the AP is updated by the server configured to manage the AP.

13. An access point AP, comprising a processor, a memory, and a transceiver, wherein the transceiver is configured to receive and send data under control of the processor, the memory stores a preset program, and the processor reads the program stored in the memory, and executes the following process according to the program:

receiving, by using the transceiver, a request message that is for requesting to provide an AP feature and that is sent by a terminal; and instructing, according to the request message, the transceiver to return a response message to the terminal, wherein the processor is specifically configured to:

receive, by using the transceiver, a Dynamic Host Configuration Protocol DHCP packet sent by the terminal, wherein the DHCP packet comprises an options extension field whose value is a preset value, and the options extension field whose value is the preset value is used to request the AP to provide an AP feature; and return a DHCP response packet to the terminal by using the transceiver, wherein an options extension field whose value is the preset value and that is in the DHCP response packet carries an AP feature provided by the AP or is null.

14. The AP according to claim 13, wherein the processor is specifically configured to:

receive, by using the transceiver, an AP feature configured by a server configured to manage the AP; or the processor is specifically configured to:

receive, by using the transceiver, a feature generation rule configured by a server configured to manage the AP; and determine an AP feature according to the feature generation rule received by using the transceiver.

15. The AP according to claim 13, wherein the processor is specifically configured to:

receive, by using the transceiver, a probe request frame sent by the terminal, wherein a frame body of the probe request frame carries a special service set identifier SSID, and the special SSID is used to request the AP to provide an AP feature; and return a probe response frame to the terminal by using the transceiver, wherein a frame body of the probe response frame carries the special SSID and information carried in a supported rates field corresponding to the special SSID, and the supported rates field corresponding to the special SSID carries an AP feature provided by the AP or is null.

* * * * *